(12) United States Patent
Barefoot

(10) Patent No.: US 11,008,062 B2
(45) Date of Patent: May 18, 2021

(54) SUSPENSION INCLUDING COIL SPRING AND AMBIENT AIR CUSHION

(71) Applicant: Eko Sport, Inc., Grand Junction, CO (US)

(72) Inventor: Darek C. Barefoot, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 228 days.

(21) Appl. No.: 16/054,293

(22) Filed: Aug. 3, 2018

(65) Prior Publication Data

US 2019/0054973 A1   Feb. 21, 2019

Related U.S. Application Data

(60) Provisional application No. 62/546,931, filed on Aug. 17, 2017.

(51) Int. Cl.
| | |
|---|---|
| *B62K 25/08* | (2006.01) |
| *F16F 9/02* | (2006.01) |
| *F16F 13/00* | (2006.01) |
| *F16F 9/46* | (2006.01) |
| *F16F 9/43* | (2006.01) |
| *F16F 9/06* | (2006.01) |

(52) U.S. Cl.
CPC ............ *B62K 25/08* (2013.01); *F16F 9/0281* (2013.01); *F16F 9/068* (2013.01); *F16F 9/435* (2013.01); *F16F 9/466* (2013.01); *F16F 13/007* (2013.01); *B62K 2201/04* (2013.01); *B62K 2201/08* (2013.01)

(58) Field of Classification Search
CPC ............... B62K 25/08; B62K 2201/08; B62K 2201/04; F16F 13/007; F16F 9/466; F16F 9/435; F16F 9/0281; F16F 9/068
USPC ........................................................ 280/276
See application file for complete search history.

(56) References Cited

U.S. PATENT DOCUMENTS

| | | | |
|---|---|---|---|
| 2,101,265 | A | 12/1937 | Mercier |
| 4,122,923 | A | 10/1978 | Ellis et al. |
| 5,417,446 | A | 5/1995 | Pileggi |
| 5,775,677 | A | 7/1998 | Englund |
| 5,848,675 | A | 12/1998 | Gonzalez |
| 6,095,541 | A | 8/2000 | Turner et al. |
| 6,217,049 | B1 | 4/2001 | Becker |
| 7,641,028 | B2 | 1/2010 | Fox |
| 7,703,585 | B2 | 4/2010 | Fox |
| 8,448,761 | B2 * | 5/2013 | Shipman ............... F16F 9/0245 188/322.15 |
| 8,464,850 | B2 | 6/2013 | Fox |
| 8,511,448 | B2 * | 8/2013 | Gonzalez ............... B62K 25/08 188/319.2 |

(Continued)

*Primary Examiner* — Jacob D Knutson
*Assistant Examiner* — Felicia L. Brittman
(74) *Attorney, Agent, or Firm* — Jason H. Foster; Kremblas & Foster

(57) ABSTRACT

A front fork of a bicycle may include a suspension system that includes a damper. The damper may include a hollow tube with orifices that may be partially blocked by an adjustable blocker. A free end of the adjuster that adjusts the blocker may maintain its axial position in any rotational position. Ambient air may be introduced through a valve and retained in the suspension system. The suspension may include a mechanical spring in a chamber away from the valve that introduces the ambient air.

10 Claims, 9 Drawing Sheets

(56) References Cited

U.S. PATENT DOCUMENTS

| | | |
|---|---|---|
| 8,752,681 B2 | 6/2014 | Fox |
| 9,415,653 B2 | 8/2016 | Franklin et al. |
| 9,567,029 B2 | 2/2017 | Fox |
| 9,796,447 B2 | 10/2017 | Fox |
| 9,802,670 B2 | 10/2017 | Fox |
| 2005/0104320 A1 | 5/2005 | Wesling et al. |
| 2008/0041681 A1* | 2/2008 | Shipman .................. F16F 9/56 188/319.2 |
| 2008/0296814 A1 | 12/2008 | Franklin et al. |
| 2009/0236807 A1 | 9/2009 | Wootten et al. |
| 2010/0117329 A1 | 5/2010 | Achenbach et al. |
| 2010/0225081 A1 | 9/2010 | Galasso et al. |
| 2011/0121525 A1 | 5/2011 | Shirai |
| 2013/0105260 A1 | 5/2013 | Chen et al. |
| 2013/0118847 A1 | 5/2013 | Krahenbuhl et al. |
| 2013/0134687 A1 | 5/2013 | Laird et al. |
| 2016/0348747 A1 | 12/2016 | Franklin et al. |
| 2017/0106937 A1 | 4/2017 | Fox |
| 2017/0356518 A1 | 12/2017 | Vallander et al. |
| 2018/0057100 A1 | 3/2018 | Fox |

* cited by examiner

SUSPENSION INCLUDING COIL SPRING AND AMBIENT AIR CUSHION

CROSS-REFERENCES TO RELATED APPLICATIONS

This application claims the benefit of U.S. Provisional Application No. 62/546,931 filed Aug. 17, 2017.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates to a suspension system that includes a coil spring and a progressive resistance air chamber. More specifically, the present design relates to one fork of a suspension system of a bicycle that includes a coil spring and an air chamber that resists compression.

Many bicycle suspension systems incorporate a coil spring in a front fork. Riders often tune their coil springs to allow the springs to absorb or minimize the impact to the rider for typical obstacles that a rider might encounter. However, because many of these typical obstacles are relatively small, the suspension may not fully absorb the impact from larger obstacles or drops. Instead, the suspension tends to fully compress or "bottom out", thereby transmitting the force to the rider, which is an undesirable condition.

For many cyclists, it is important to be able to vary the rate at which the front fork of a bicycle compresses when it hits an obstacle. Some cyclists prefer a stiffer feel, while others prefer a softer feel. Still others have differing preferences depending on the particular terrain and objects likely to be encountered in an off-road environment. It is also important for the suspension to resist hard bottoming during severe compression.

In many conventional shock absorbers, a spring is damped under compression and rebound by controlling the flow of a substantially incompressible fluid. However, achieving an increasing damping force during compression with such a system in order to avoid hard bottoming may require complicated valve arrangements that increase cost compared with achieving the same goal by controlling a compressible gas. Also, a damping device that uses gas may be more convenient to service than one requiring an incompressible fluid, such as oil.

Accordingly, in many embodiments, it may be desirable to incorporate a feature that gives progressive resistance to the suspension near the full compression or "bottom out". In some embodiments, the feature may incorporate the use of air to act in a manner to resist compression and absorb energy near the end of the suspension stroke.

BRIEF SUMMARY OF THE INVENTION

The present invention is directed to a suspension system. The suspension system may include a first tube, a second tube, a barrier, a hollow road, an adjustable blocker, and first and second substantially one-way valves.

The first tube may at least partially define a first chamber substantially filled with a gas. The second tube may have a free end interfitted with the first tube and may at least partially define a second chamber substantially filled with the gas.

The barrier may be adjacent the free end of the second tube. The barrier may include the first substantially one-way valve, which valve may allow the gas to flow from the second chamber to the first chamber.

The hollow rod may be attached to the first tube and may extend through the barrier and into the second tube. The hollow rod may have an interior cavity and an open end and may define at least one orifice which allows the gas to flow between the first chamber and the interior cavity The adjustable blocker may be capable of controlling the rate at which the gas flows through the at least one orifice during movement of the barrier towards the closed end of the first tube.

The second substantially one-way valve may permit the introduction of additional gas from outside the first and second tubes into one of the first and second chambers while substantially preventing the venting of gas from the first and second chambers outside the first and second tubes.

Upon a compression stroke, movement of the barrier within the first tube may move at least some of the gas from the first chamber through the orifice at a rate depending on the position of the adjustable blocker, into the interior cavity, and into the second chamber. Upon an expansion stroke, at least some of the gas may flow through the first substantially one-way valve. The gas may be substantially retained within the first and second tubes during the compression and expansion strokes.

The suspension system may further comprise a resilient member attached to the adjustable blocker. The suspension system may further comprise a resilient member adjacent the adjustable blocker. The second substantially one-way valve may comprise a spring and a blocker.

The suspension may further include an adjuster attached to the adjustable blocker. A free end of the adjuster may extend from the first tube. Rotation of at least one portion of the adjuster may cause axial movement of the adjustable blocker. The free end of the adjuster may maintain a single axial position, regardless of its rotational position.

The first substantially one-way valve may comprise a seal that is gas-permeable in a first direction from the second chamber to the first chamber. The first substantially one-way valve may prevent gas flow in the opposite direction.

In another embodiment, a suspension system includes a first tube, a second tube, a barrier, a hollow rod, a mechanical spring, an adjustable blocker, and first and second substantially one-way valves.

The first tube may at least partially define a first chamber substantially filled with a gas. The second tube may have a free end interfitted with the first tube and may at least partially define a second chamber substantially filled with the gas. The barrier may be adjacent the free end of the second tube. The barrier may include the first substantially one-way valve, which valve may allow the gas to flow from the second chamber to the first chamber. The hollow rod may be attached to the first tube and may extend through the barrier and into the second tube. The hollow rod may have an interior cavity and an open end and may define at least one orifice which allows the gas to flow between the first chamber and the interior cavity. The mechanical spring may be in the second tube. The adjustable blocker may be capable of controlling the rate at which the gas flows through the at least one orifice during movement of the barrier towards the closed end of the first tube. The second substantially one-way valve may permit the introduction of additional gas from outside the first and second tubes directly into the first chamber while substantially preventing the venting of gas from the first and second chambers outside the first and second tubes.

The suspension system may further comprise a resilient member attached to the adjustable blocker. The suspension system may further comprise a resilient member adjacent the adjustable blocker. The second substantially one-way valve may comprise a spring and a blocker.

The suspension may further include an adjuster attached to the adjustable blocker. A free end of the adjuster may extend from the first tube. Rotation of at least one portion of the adjuster may cause axial movement of the adjustable blocker. The free end of the adjuster may maintain a single axial position, regardless of its rotational position.

The first substantially one-way valve may comprise a seal that is gas-permeable in a first direction from the second chamber to the first chamber. The first substantially one-way valve may prevent gas flow in the opposite direction.

In another embodiment, a suspension system may include a first tube, a second tube, a barrier, a hollow rod, and a valve.

The first tube may at least partially define a first chamber substantially filled with a gas. The second tube may have a free end interfitted with the first tube and may at least partially define a second chamber substantially filled with the gas. The barrier may be adjacent the free end of the second tube. The barrier may include a substantially one-way valve allowing the gas to flow from the second chamber to the first chamber. The hollow rod may be attached to the first tube and may extend through the barrier and into the second tube. The hollow rod may have an interior cavity and an open end. The hollow rod may define at least one orifice allowing the gas to flow between the first chamber and the interior cavity. The valve may be within the hollow rod and may be capable of controlling the rate at which the gas flows through the at least one orifice during movement of the barrier towards the closed end of the first tube. The valve may include at least one resilient portion. At least one portion of the valve may have an adjustable position.

Upon a compression stroke, movement of the barrier within the first tube may move at least some of the gas from the first chamber through the orifice at a rate depending on the position of the adjustable blocker, into the interior cavity, and into the second chamber. Upon an expansion stroke, at least some of the gas may flow through the first substantially one-way valve.

The resilient portion may comprise a spring. The resilient portion may comprise an elastomeric portion. The suspension system may further include a blocker, and the resilient portion may be on the blocker.

Figure 1:
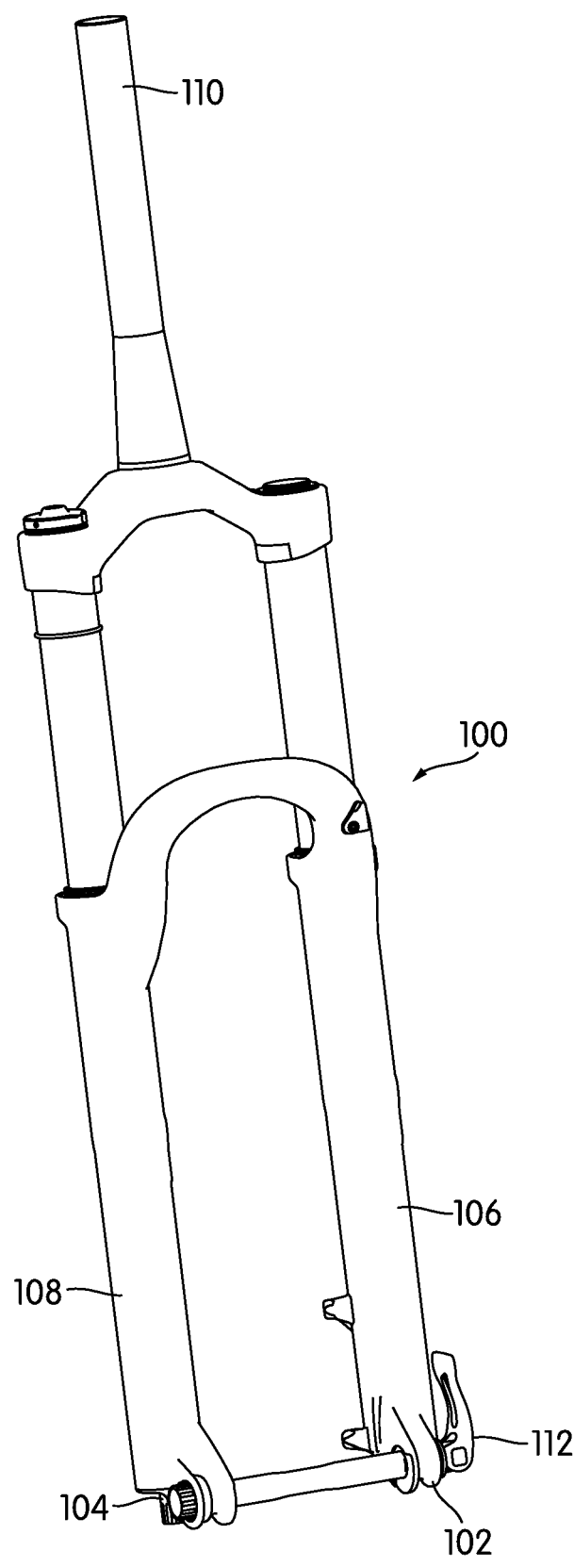
FIG. 1 is a perspective view of one embodiment of a suspension system according to the disclosure.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used.

The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

Figure 2:
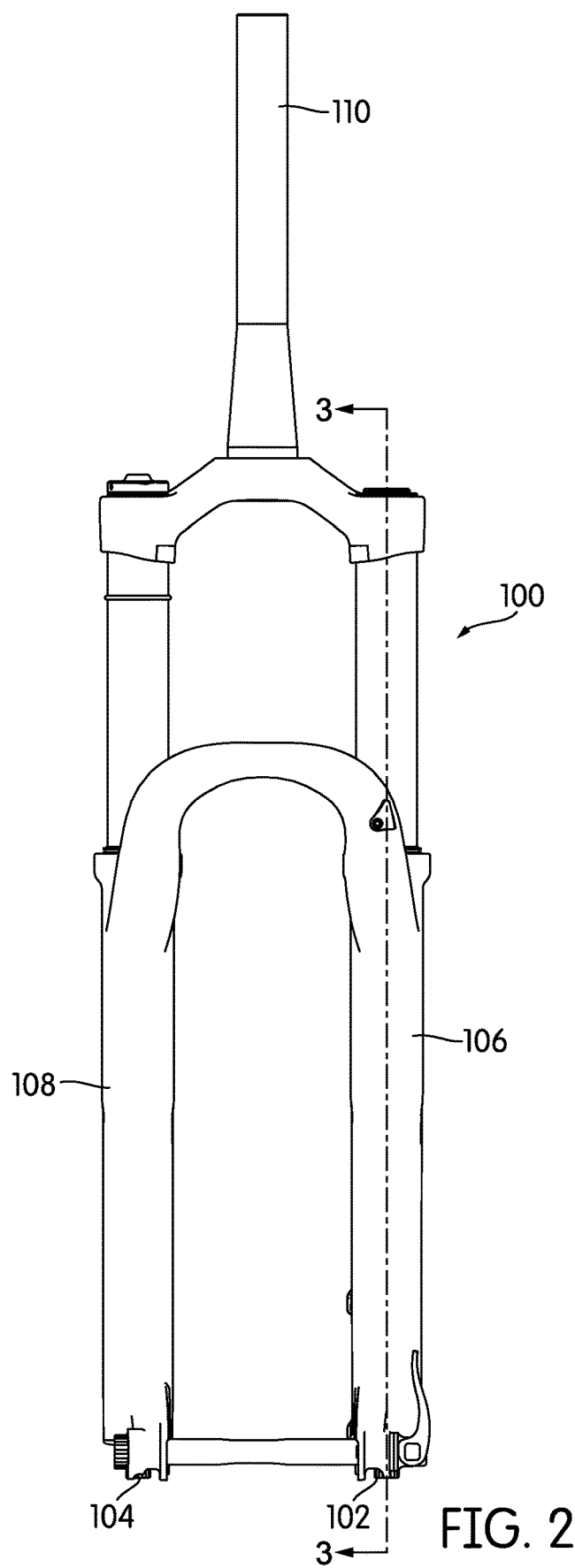
FIG. 2 is a side view of the suspension system of FIG. 1.

As shown in FIGS. 1 and 2, the present embodiments include structure that can be incorporated into a suspension 100 for a bicycle (not shown), which may be used to dampen shocks that may occur when a wheel (not shown) attached to a first lower end 102 and a second lower end 104 of the suspension system 100 encounters an obstacle. The first lower end 102 may be the lower end of the first leg 106 of the suspension 100 and the second lower end 104 may be the lower end of the second leg 108 of the suspension 100. The suspension system 100 may dampen the impact force so that it is lessened or eliminated before it reaches a bicycle frame (not shown) that may be attached to an upper end 110 of the suspension 100, and before it reaches the rider on the bicycle frame. The wheel (not shown) may be attached to the suspension system 100 using any desirable axle system, including one that uses a quick release 112, shown only for illustration of one possible axle system, and not intended to limit the use of the disclosed embodiments, and the frame (not shown) may be attached to the suspension system 100 using any desirable system, and these attachments are well within the knowledge and experience of a person having ordinary skill in the art.

Figure 3:
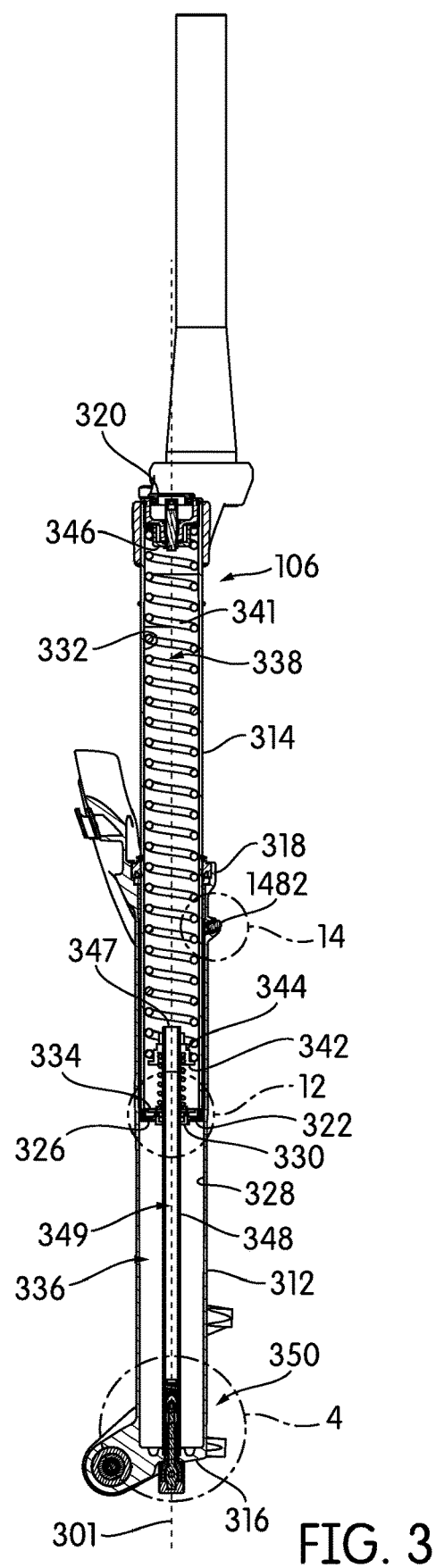
FIG. 3 is a cross-sectional view of one arm of the suspension system taken along the line 3-3 of FIG. 2.

Turning now to FIG. 3, which is a partial cross section of the first leg 106 taken along line 3-3 of FIG. 2, the first leg 106 may include a first tube 312 and a second tube 314. The first tube 312 may be configured to have a closed end 316 and an open end 318. The second tube 314 may be configured to have a first end 320 and a second end 322. The first tube 312 and the second tube 314 may be configured so that the free end or second end 322 of the second tube 314 may telescopically and slidingly engage or interfit with or within the open end 318 of the first tube 312.

As shown in FIG. 3, the first leg 106 may have a central axis 301 that runs the length of the first leg 106. In the present disclosure, when a structure is described a having an axial position or moving axially, that structure or motion is described relative to a position or movement along the axis 301. Similarly, if a structure is described as having a rotational position or moving rotationally, it means moving rotationally with a point or line coincident with the axis 301 at its center. Manufacturing tolerances and design changes that may make a particular part slightly off-center from the precise axis 301 are still included within this definition of axial and rotational movement, such that axes that may differ slightly from the axis 301 may still be considered the axis for axial motion or rotation.

A barrier 326 may be configured to be positioned adjacent, near or at the second end 322 of the second tube 314. An inner surface 328 of the first tube 312 and a first side 330 of the barrier 326 may define a first chamber 336. An inner surface 332 of the second tube 314 and a second side 334 of the barrier 326 may define a second chamber 338. Each of the first chamber 336 and the second chamber 338 may contain gas. In many embodiments, the suspension 100 may not be air-tight, but may instead allow air to flow substantially one way into the suspension 100, and more specifically, directly into the first chamber 336, as will be described below. Accordingly, in many embodiments, the first chamber 336 and the second chamber 338 may be filled with ambient air at ambient temperature and pressure.

Figure 12:
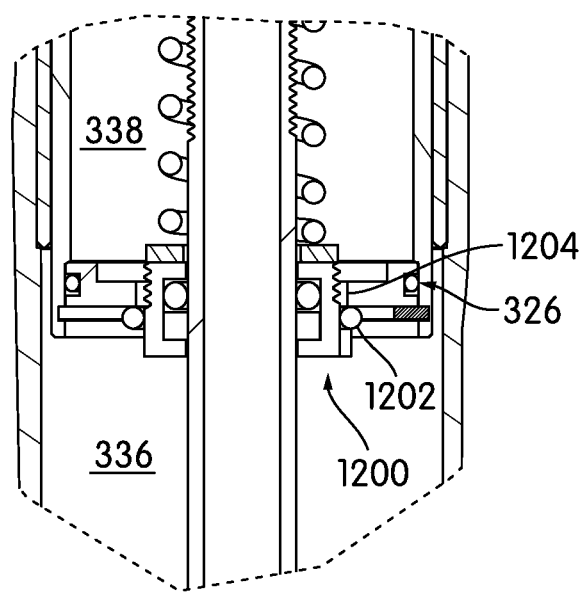
FIG. 12 is an enlarged view of the circled portion of the embodiment shown in FIG. 3 and numbered as 12.

Turning now to FIG. 12, in some embodiments, the barrier 326 may further include a substantially one-way valve 1200. In some embodiments, the substantially one-way valve 1200 may permit gas to flow from the second chamber 338 to the first chamber 336, but may substantially prevent gas from flowing from the first chamber 336 to the second chamber 338. In many embodiments, it may be desirable for the substantially one-way valve 1200 to include a seal or o-ring 1202 that is capable of substantially preventing air flow through a passageway or orifice 1204 defined by or through the barrier 326. The use of a seal 1202 may allow the substantially one-way valve 1200 to be gas permeable, allowing pressure or force from gas in the second chamber 338 that exceeds the pressure or force from gas in the first chamber 336 to displace the seal 1202 and flow around the seal 1202 into the first chamber 336 (the displaced position is not shown in this FIG., but is easily understood by a person of ordinary skill in the art). When the gas pressure or force in the first chamber 336 equals the gas pressure or force in the second chamber 338, or when the gas pressure or force in the first chamber 336 exceeds the gas pressure or force in the second chamber 338, the seal 1202 may return to the position shown in FIG. 12, thereby minimizing or preventing the flow of gas from the first chamber 336 to the second chamber 338 through the passageway 1204.

Returning to FIG. 3, a spring, such as the coil spring 341, may be positioned within the second chamber 338. The spring 341 may be conventional and may be selected by a person having ordinary skill in the art to have the characteristics deemed desirable for a particular ride condition. A piston or plate 342 may be fixed to a rod 348, which may be attached to the first end 312 and may extend from the closed end 316 of the first tube 312, through the barrier 322, and into the second chamber 338. In some embodiments, the rod 348 may be hollow, and the free end 347 of the hollow rod 348 may be open and allow gas to flow between the second chamber 338 and the interior cavity 349 of the hollow rod 348. The plate 342 may contact or support a lower end 344 of the spring 341. The first end 320 of the second tube 314 may contact or support an upper end 346 of the spring 341.

Figure 13:
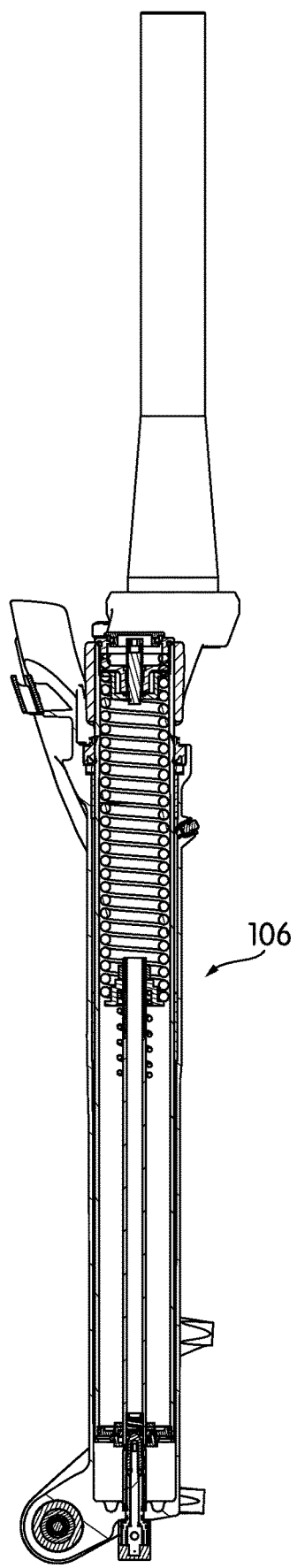
FIG. 13 is the view of FIG. 3 showing the suspension in compressed form.

Upon impact of a wheel attached to the suspension 100 with an obstacle, compression will occur. Accordingly, the barrier 326 may move within the first tube 312 towards the closed end 316 of the first tube 312, thereby compressing any gas within the first chamber 336. In this way, the first chamber 336 may be considered a compression chamber. The plate 342 may move within the second tube 314 towards the first end 320 of the second tube 314, thereby compressing the spring 341. The gas within the first chamber 336 may tend to resist movement of the barrier 326 within the first chamber 336 towards the closed end 316 of the first tube 312 and the spring 341 may tend to resist movement of the plate 342 towards the first end 320 of the second tube 314. Upon the end of the compression stroke, the force of the gas against the first side 330 of the barrier 326 and the force of the coil spring 341 against the plate 342 may urge the suspension 100 back to a position similar or identical to that shown in FIG. 3, which shows the suspension 100 generally in an extended position. This general configuration and suspension stroke is analogous to conventional designs, and any modifications to this design would be well within the capabilities of a typical designer. FIG. 13 shows a cross section of the leg 106 showing the suspension in a generally compressed position.

However, in some embodiments, the suspension 100 may include a damping system 350 that may be incorporated into the suspension. The primary features of the damping system 350 may be seen in the remaining drawings. The damping system 350 may, in many embodiments, be incorporated at least partially within the interior cavity 349 of the hollow rod 348. In each of the embodiments that follow, the remaining elements of the suspension system 100 may remain the same or substantially the same as that shown in FIG. 3 and the other FIGS. mentioned above, unless they are specifically described as differing from the general configuration.

Figure 4:
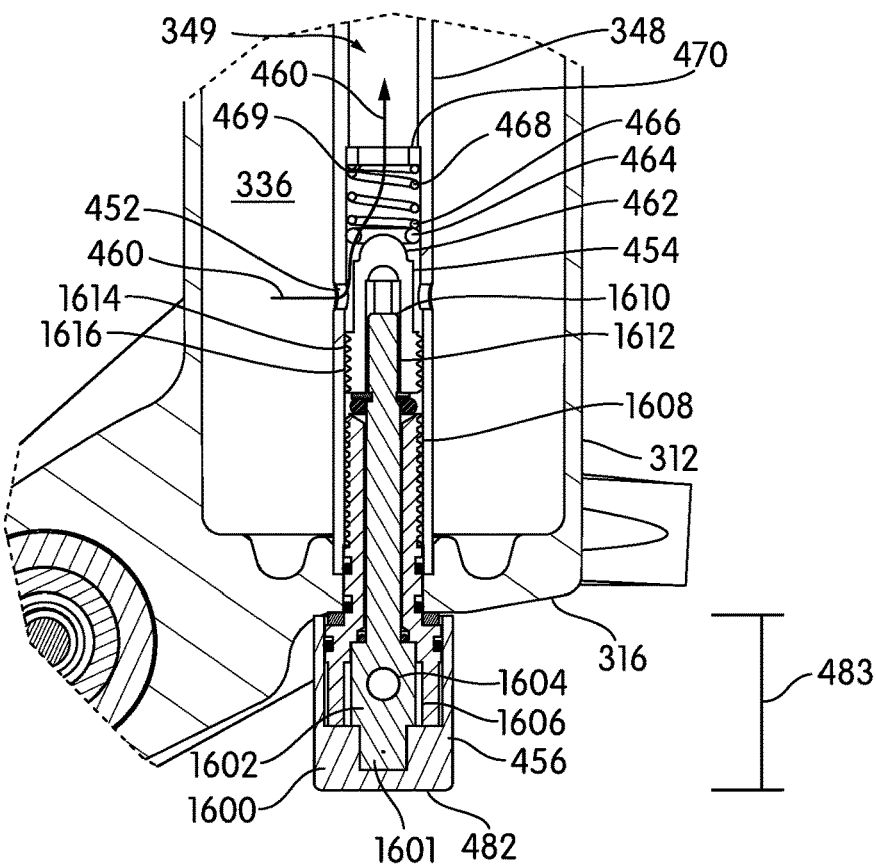
FIG. 4 is an enlarged view of the circled portion of the embodiment shown in FIG. 3 and numbered as 4, including a first embodiment showing a blocker in a substantially open position.
Figure 5:
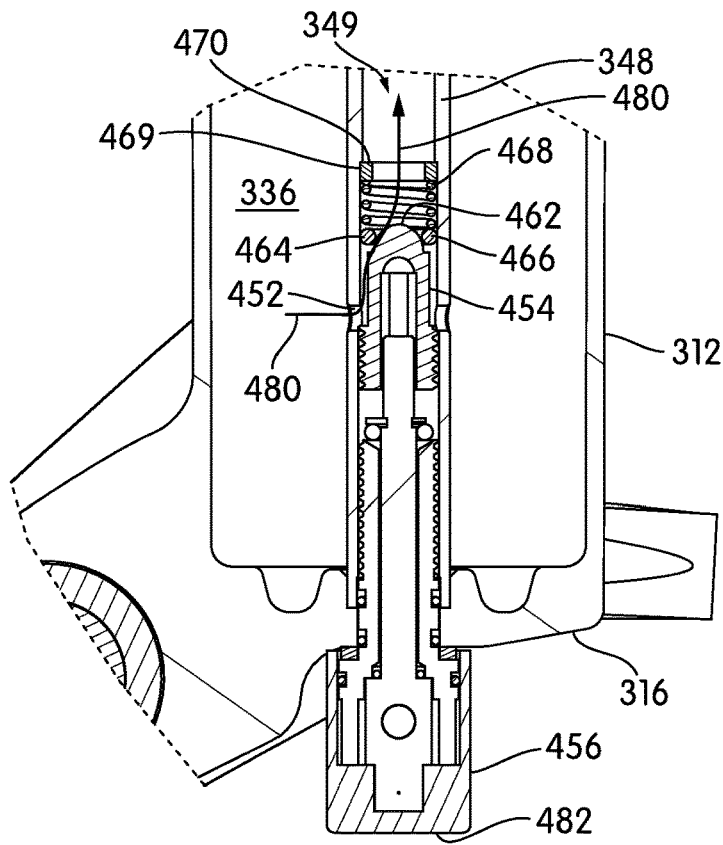
FIG. 5 is the enlarged view of FIG. 4 showing the blocker in a substantially closed position.

FIGS. 4 and 5 show a first embodiment of a damping system 350. The damping system may include the hollow rod 348. At least one or a series of orifices 452 may be defined in the hollow rod 348. The orifices may permit gas to flow between the first chamber 336 and an interior cavity 349 within the hollow rod 348. In many embodiments, the hollow rod 348 may be open at its free end 347. Therefore, in many embodiments, gas may be permitted to flow from the compression chamber 336, through the hollow rod 348 and into the second chamber 338. The manner or rate in which gas is permitted to flow may be defined by the position of an adjustable damping blocker 454.

The adjustable blocker 454 may be positioned within the interior cavity 349 of the hollow rod 348. One end of the adjustable blocker 454 may be attached to an adjuster 456. The adjuster 456 may extend outside the closed end 316 of the first tube 312, and may include a knob, dial, or other structure that may allow a rider or any other person to adjust the position of the damping blocker 454 relative to the at least one orifice 452. In many embodiments, it is desirable for the free end 482 of the adjuster 456 to remain a fixed axial distance 483 from closed end 316 of the first tube 312. In the illustrated embodiments, the closed end 316 of the first tube 312 may be adjacent the structure that attaches the suspension system 100 to the wheel (not shown), for example the quick release 112 (see FIG. 1), or other moving parts, such as parts of a brake system or other functional parts of the vehicle. In addition, in use, the position of the adjuster 456 may make it vulnerable to damage from contact with rocks, sticks, and other objects in the riding environment. Accordingly, in many embodiments, it may be desirable for the adjuster to be of a shape and size to have a minimal profile, while still being large enough for a user to manipulate it, particularly without the use of other tools. Additionally, it may be desirable for rotation of at least one portion of the adjuster 456 to be capable of causing axial movement of the blocker 454 without the adjuster 456 also axially moving, so that the free end 482 of the adjuster maintains a single axial position, regardless of its rotational position.

One possible embodiment for such an adjuster is shown in FIG. 4, and this embodiment may be similarly used in connection with any of the illustrated embodiments to move the respective blockers illustrated in those embodiments. The adjuster 456 may include a knob 1600 that may be rotated or otherwise manipulated by a user. The knob 1600 may be attached, such as by a set screw (not shown) to a first end 1601 of a key 1602. If desired, the knob 1600, key 1602 or another element of the adjuster 456 may include visual, tactile, or other sort of indicia to assist a user in setting an appropriate position of the blocker 454. One example of a tactile indicia is a ball and spring embedded, as at 1604 within the key 1602. The ball may enter one of the grooves 1606 on the inside of a screw 1608, which may provide a vibrational response to the user that the ball has entered a different groove 1606. The blocker 454 may include an interior cavity 1610 that is hexagonal. The key 1602 may include a similar hexagonal profile. A hexagonal shape is not necessary to the use of the present configuration, but in many embodiments, a mating and non-round configuration is desirable. The blocker 454 may include a threaded portion 1614 on its exterior that may mate with a similar thread 1616 on the interior cavity 349 of the hollow rod 348. Accordingly, when the key 1602 is rotated, the rotation of the key 1602 may cause the position of the blocker to translate axially along the interior cavity 349 of the hollow rod 348, while leaving the axial position of the key 1602 and the related knob 1600 unaffected. Accordingly, the free end 482 of the adjuster 456 may maintain a single axial position, regardless of its rotational position.

FIG. 4 shows the damping blocker 454 in a substantially open position and FIG. 5 shows the damping blocker 454 in a substantially closed position. In many embodiments, it may be desirable to configure the damping blocker 454 to restrict or control the flow of gas between the compression chamber and the second chamber. However, in many embodiments, the use of a position that completely eliminates the flow of gas around the damping blocker 454 may be undesirable, because such a position would essentially disable the damping feature of the damping system 350. A similar undesirable result may occur if the blocker 454 were positioned to allow gas to flow without any restriction at all. Accordingly, in many embodiments, the adjuster 456 may be configured only to allow the user to position the blocker 454 in any position between a substantially open and a substantially closed position, but the adjuster 456 may allow a substantially infinite adjustment anywhere between those positions.

In the substantially open position of FIG. 4, the damping blocker 454 may be positioned closer to the closed end 316 of the first tube 312 than when it is in the substantially closed position of FIG. 5. Upon a compression stroke, when the barrier 326 moves within the compression chamber 336, gas from the compression chamber 336 may move through the at least one orifice 452, past the damping blocker 454, into and through the interior chamber 349 and into the second chamber 338. This air flow is shown using the arrow 460.

In the substantially closed position of FIG. 5, gas takes a similar route. However, in the substantially closed position, the free end 462 of the damping blocker 454 may contact a seal 464 attached to one end 466 of a spring 468. The opposite end 469 of the spring 468 may be attached to a spring stop 470 secured to the hollow rod 348. When the damping blocker 454 is in or near contact with the seal 464, the gas from the compression chamber 336 may be retained within the compression chamber 336 until the force of the gas pressure exceeds the spring pressure from the spring 468. When the gas pressure reaches the triggering threshold, the air pressure may overcome the spring force, thereby moving the spring 468 and the seal 464 and allowing the gas to flow through the orifice 452, around the blocker 454 and into and through the interior cavity 349, and into the second chamber 338. This gas flow is shown using the arrow 480. This configuration may be more easily used when the gas in the suspension system is under pressure, in order for the gas pressure or force to overcome the spring force, but it may also be used when the gas is ambient air pressure.

Upon reaching the full compression stroke, at least some of the gas that moved from the compression chamber 336 to the second chamber 338 may return to the compression chamber 336 by flowing around the seal 1202, as was described above. In some positions of the blocker 454, gas may travel in a reverse direction through the interior cavity 349 and into the compression chamber 336.

Figure 6:
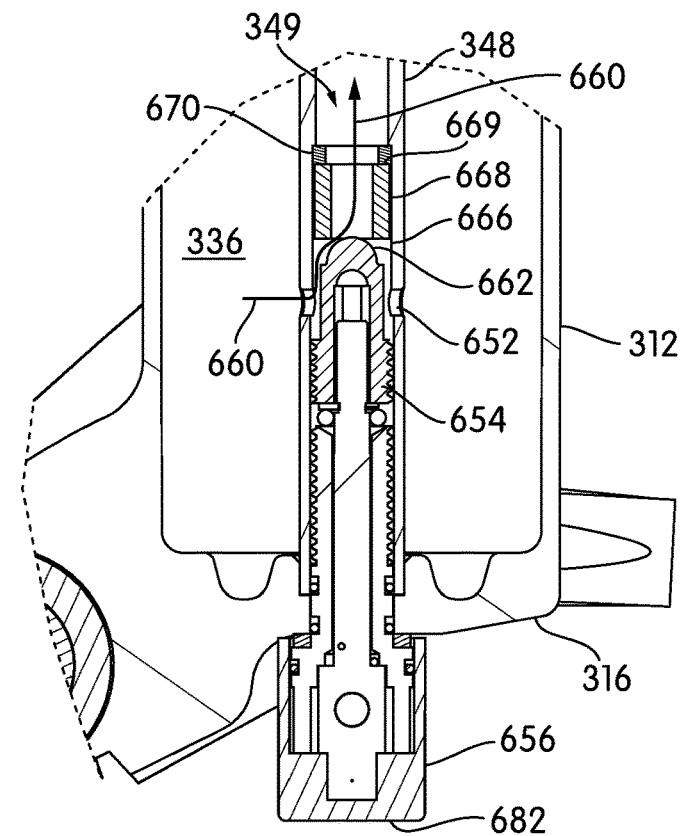
FIG. 6 is an enlarged view of the circled portion of the embodiment shown in FIG. 3 and numbered as 4, including another embodiment showing a blocker in a substantially open position.
Figure 7:
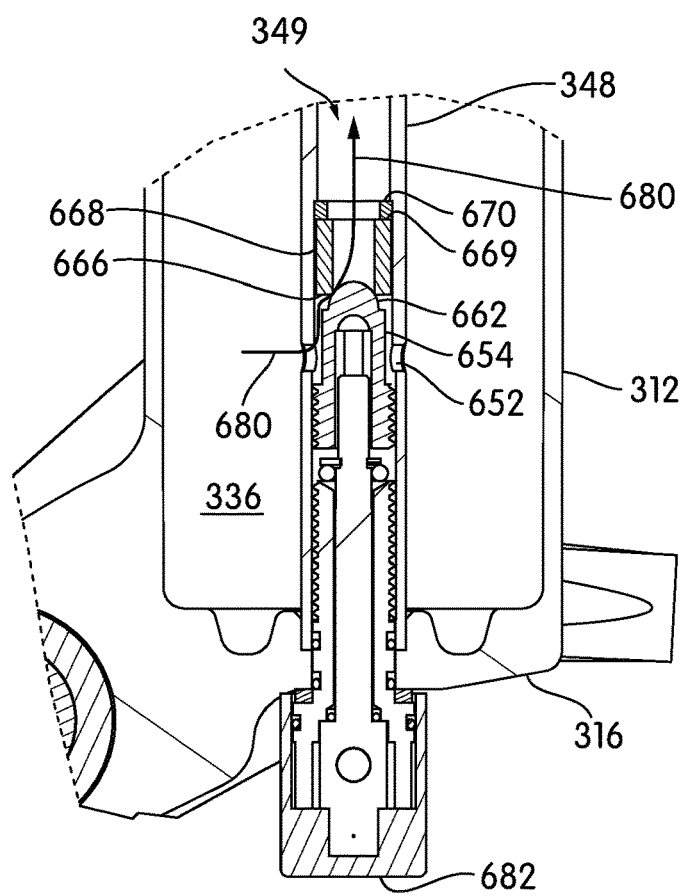
FIG. 7 is the enlarged view of FIG. 7 showing the blocker in a substantially closed position.

FIGS. 6 and 7 show a second embodiment of a damping system 350. The damping system may include the hollow rod 348. At least one or a series of orifices 652 may be defined in the hollow rod 348. The orifices may permit gas to flow between the first chamber 336 and the interior cavity 349 within the hollow rod 348. In many embodiments, the hollow rod 348 may be open at its free end 347. Therefore, in many embodiments, gas may be permitted to flow from the compression chamber 336, through the interior cavity 349 of the hollow rod 348 and into the second chamber 338.

The manner and rate in which gas is permitted to flow may be defined by the position of the damping blocker 654.

The damping blocker 654 may be positioned within the interior cavity 349 of the hollow rod 348. One end of the damping blocker 654 may be attached to an adjuster 656. The free end 682 of the adjuster 656 may extend outside the first tube 312, and may include a knob, dial, or other structure that may allow a rider or any other person to adjust the position of the damping blocker 654 relative to the at least one orifice 652. The adjuster 656 may have the same or substantially the same configuration as that described in connection with the adjuster 456, such that the free end 682 of the adjuster 656 may maintain a single axial position, regardless of its rotational position.

FIG. 6 shows the damping blocker 654 in a substantially open position and FIG. 7 shows the damping blocker 654 in a substantially closed position. In many embodiments, it may be desirable to configure the damping blocker 654 to restrict or control the flow of gas between the compression chamber and the second chamber. However, in many embodiments, the use of a position that completely eliminates the flow of gas around the damping blocker 654 may be undesirable, because such a position would essentially disable the damping feature of the damping system 350. A similar undesirable result may occur if the blocker 654 were positioned to allow gas to flow without any restriction at all. Accordingly, in many embodiments, the adjuster 656 may be configured only to allow the user to position the blocker 654 in any position between a substantially open and a substantially closed position, but the adjuster 656 may allow a substantially infinite adjustment anywhere between those positions.

In the substantially open position of FIG. 6, the damping blocker 654 may be positioned closer to the closed end 316 of the first tube 312 than when it is in the substantially closed position of FIG. 7. Upon a compression stroke, when the barrier 326 moves within the compression chamber 336, gas from the compression chamber 336 may move through the at least one orifice 652, past the damping blocker 654, and into the interior cavity 349. This flow is shown using the arrow 660.

In the substantially closed position of FIG. 7, gas takes a similar route. However, in the substantially closed position, the free end 662 of the damping blocker 654 may contact a one end 666 of a resilient material 668 that may function like a spring. In the embodiment shown in FIGS. 6 and 7, the resilient material 668 is shown as a cylinder, but another configuration could be used, if desired by a designer, to give a different compression profile. The opposite end 669 of the resilient material 668 may be attached to a spring stop 670 secured to the hollow rod 348. When the damping blocker 654 is in or near contact with the one end 666, the gas from the compression chamber 336 may be retained within the compression chamber 336 until the force of the gas pressure exceeds the spring pressure from the resilient material 668. When the gas pressure reaches the triggering threshold, the gas pressure may overcome the spring force, thereby compressing and moving the resilient material 668 and allowing the gas to flow around the blocker 654, into and through the interior cavity 349, and into the second chamber 338. This flow is shown using the arrow 680. This configuration may be more easily used when the gas in the suspension system is under pressure, in order for the gas pressure or force to overcome the spring force, but it may also be used when the gas is ambient air pressure.

Upon reaching the full compression stroke, the gas that moved from the compression chamber 336 to the second chamber 338 may return to the compression chamber 336 by flowing around the seal 1202 as was described above. In some positions of the blocker 654, gas may travel in a reverse direction through the interior cavity 349 and into the compression chamber 336.

Figure 8:
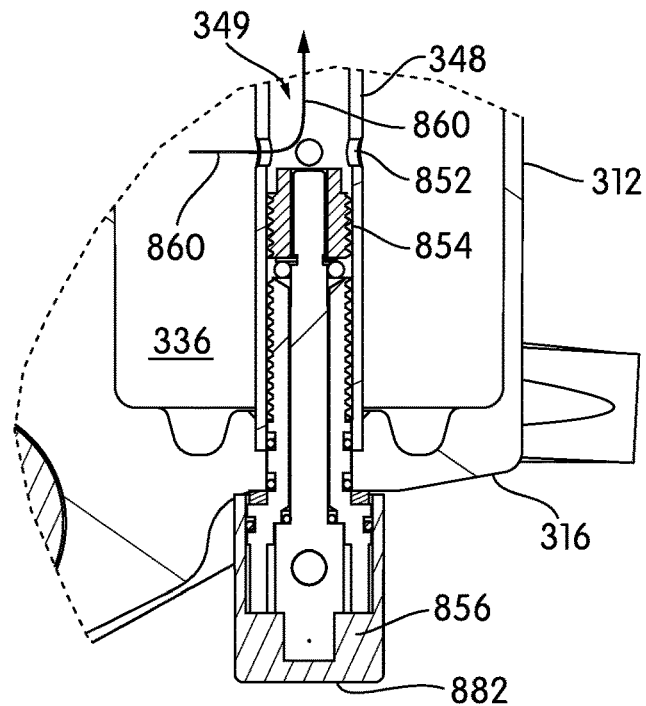
FIG. 8 is an enlarged view of the circled portion of the embodiment shown in FIG. 3 and numbered as 4, including yet another embodiment showing a blocker in a substantially open position.
Figure 9:
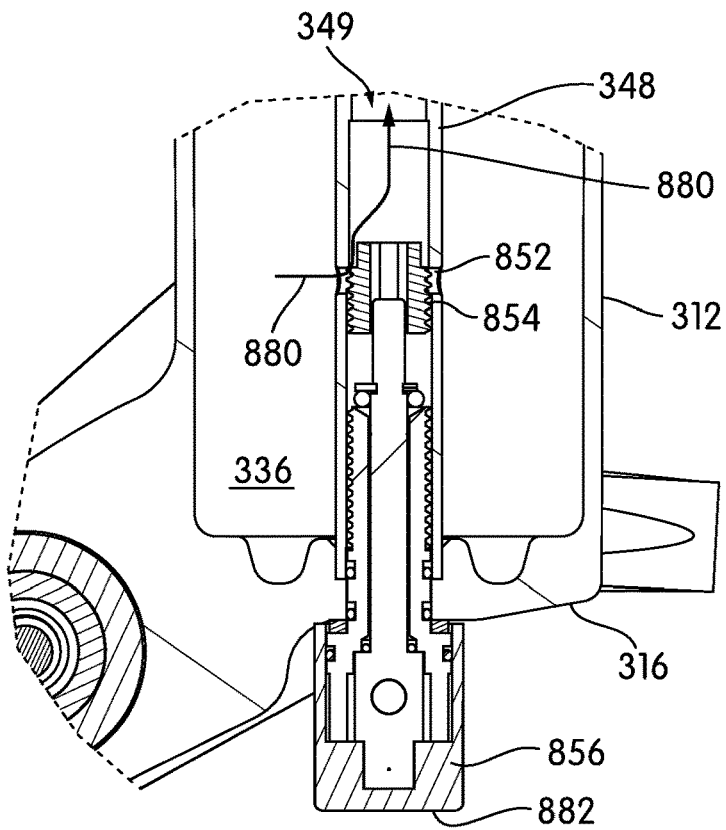
FIG. 9 is the enlarged view of FIG. 8 showing the blocker in a substantially closed position.

FIGS. 8 and 9 show a third embodiment of a damping system 350. The damping system may include the hollow rod 348. At least one or a series of orifices 852 may be defined in the hollow rod 348. The orifices may permit gas to flow between the first chamber 336 and the interior cavity 349 within the hollow rod 348. In many embodiments, the hollow rod 348 may be open at its free end 347. Therefore, in many embodiments, gas may be permitted to flow from the compression chamber 336, through the hollow rod 348 and into the second chamber 338. The manner and rate in which gas is permitted to flow may be defined by the position of the damping blocker 854.

The damping blocker 854 may be positioned within the interior cavity 349 of the hollow rod 348. One end of the damping blocker 854 may be attached to an adjuster 856. The free end 882 of the adjuster 856 may extend outside the first tube 312, and may include a knob, dial, or other structure that may allow a rider or any other person to adjust the position of the damping blocker 854 relative to the at least one orifice 852. The adjuster 856 may have the same or substantially the same configuration as that described in connection with the adjuster 456, such that the free end 882 of the adjuster 856 may maintain a single axial position, regardless of its rotational position.

FIG. 8 shows the damping blocker 854 in a substantially open position and FIG. 9 shows the damping blocker 854 in a substantially closed position. In many embodiments, it may be desirable to configure the damping blocker 854 to restrict or control the flow of gas between the compression chamber and the second chamber. However, in many embodiments, the use of a position that completely eliminates the flow of gas around the damping blocker 854 may be undesirable, because such a position would essentially disable the damping feature of the damping system 350. A similar undesirable result may occur if the blocker 854 were positioned to allow gas to flow without any restriction at all. Accordingly, in many embodiments, the adjuster 856 may be configured only to allow the user to position the blocker 854 in any position between a substantially open and a substantially closed position, but the adjuster 856 may allow a substantially infinite adjustment anywhere between those positions. Because there is no spring force to overcome, this configuration may be equally easily used when the gas in the suspension system is under pressure and when the gas is ambient air pressure.

In the substantially open position of FIG. 8, the damping blocker 854 may be positioned closer to the closed end 316 of the first tube 312 than when it is in the substantially closed position of FIG. 9. Upon a compression stroke, when the barrier 326 moves within the compression chamber 336, gas from the compression chamber 336 may move through the at least one orifice 852, past the damping blocker 854, into and through the interior cavity 349, and into the second chamber 338. This flow is shown using the arrow 860.

In the substantially closed position of FIG. 9, gas takes a similar route. However, in the substantially closed position, damping blocker 854 may be positioned directly adjacent the at least one orifice 852, thereby directly minimizing the flow of gas by directly blocking the at least one orifice 852. This flow is shown using the arrow 880.

Upon reaching the full compression stroke, the gas that moved from the compression chamber 336 to the second chamber 338 may return to the compression chamber 336 by flowing around the seal 1202 as was described above. In some positions of the blocker 854, gas may travel in a reverse direction through the interior cavity 349 and into the compression chamber 336.

Figure 10:
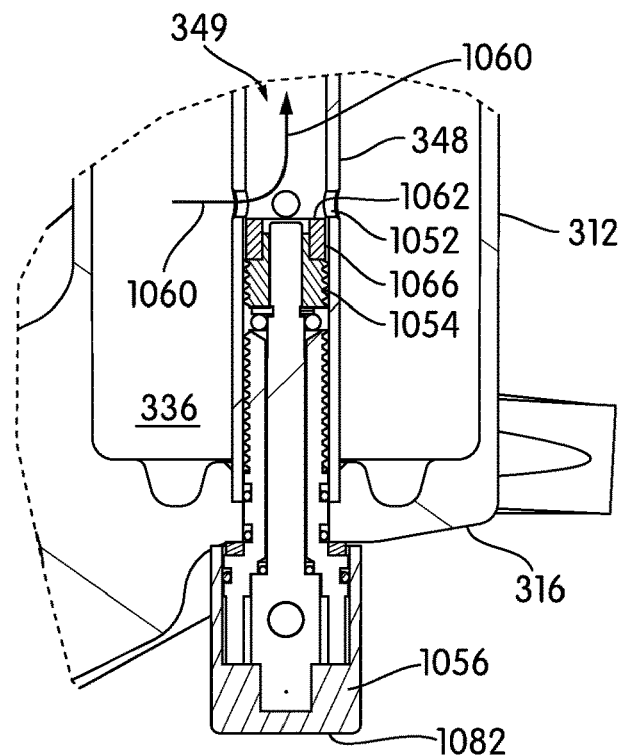
FIG. 10 is an enlarged view of the circled portion of the embodiment shown in FIG. 3 and numbered as 4, including yet another embodiment showing a blocker in a substantially open position.
Figure 11:
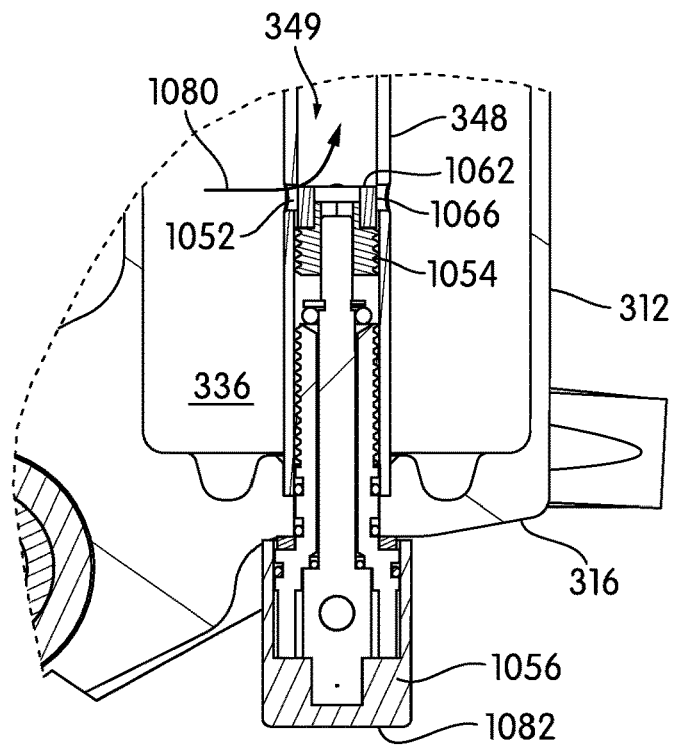
FIG. 11 is the enlarged view of FIG. 10 showing the blocker in a substantially closed position.

FIGS. 10 and 11 show a fourth embodiment of a damping system 350. The damping system may include the hollow rod 348. At least one or a series of orifices 1052 may be defined in the hollow rod 348. The orifices may permit gas to flow between the first chamber 336 and the interior cavity 349 within the hollow rod 348. In many embodiments, the hollow rod 348 may be open at its free end 347. Therefore, in many embodiments, gas may be permitted to flow from the compression chamber 336, through the hollow rod 348 and into the second chamber 338. The manner and rate in which gas is permitted to flow may be defined by the position of the damping blocker 1054.

The damping blocker 1054 may be positioned within the interior cavity 349 of the hollow rod 348. One end of the damping blocker 1054 may be attached to an adjuster 1056. The free end 1082 of the adjuster 1056 may extend outside the first tube 312, and may include a knob, dial, or other structure that may allow a rider or any other person to adjust the position of the damping blocker 1054 relative to the at least one orifice 1052. The adjuster 1056 may have the same or substantially the same configuration as that described in connection with the adjuster 456, such that the free end 1082 of the adjuster 1056 may maintain a single axial position, regardless of its rotational position.

FIG. 10 shows the damping blocker 1054 in a substantially open position and FIG. 11 shows the damping blocker 1054 in a substantially closed position. In many embodiments, it may be desirable to configure the damping blocker 1054 to restrict or control the flow of gas between the compression chamber and the second chamber. However, in many embodiments, the use of a position that completely eliminates the flow of gas around the damping blocker 1054 may be undesirable, because such a position would essentially disable the damping feature of the damping system 350. A similar undesirable result may occur if the blocker 1054 were positioned to allow gas to flow without any restriction at all. Accordingly, in many embodiments, the adjuster 1056 may be configured only to allow the user to position the blocker 1054 in any position between a substantially open and a substantially closed position, but the adjuster 1056 may allow a substantially infinite adjustment anywhere between those positions.

In the substantially open position of FIG. 10, the damping blocker 1054 may be positioned closer to the closed end 316 of the first tube 312 than when it is in the substantially closed position of FIG. 11. Upon a compression stroke, when the barrier 326 moves within the compression chamber 336, gas from the compression chamber 336 may move through the at least one orifice 1052, past the damping blocker 1054, into and through the interior cavity 349, and into the second chamber 338. This flow is shown using the arrow 1060.

In the substantially closed position of FIG. 11, gas takes a similar route. However, in the substantially closed position, the free end 1062 of the damping blocker 1054 may include a resilient material 1066 that may function as a spring. When the resilient material 1066 is placed adjacent the at least one orifice 1052, the gas from the compression chamber 336 may be retained within the compression chamber 336 until the force of the gas pressure exceeds the spring pressure from resilient material 1066. When the air pressure reaches the triggering threshold, the gas pressure may overcome the spring force, thereby compressing the resilient material 1066 and allowing the gas to flow around the blocker 1054 and into the passage 349. This flow is shown using the arrow 1080. This configuration may be more easily used when the gas in the suspension system is under pressure, in order for the gas pressure or force to overcome the spring force, but it may also be used when the gas is ambient air pressure.

Upon reaching the full compression stroke, the gas that moved from the compression chamber 336 to the second chamber 338 may return to the compression chamber 336 by flowing around the seal 1202 as was described above. In some positions of the blocker 1054, gas may travel in a reverse direction through the interior cavity 349 and into the compression chamber 336.

Figure 14:
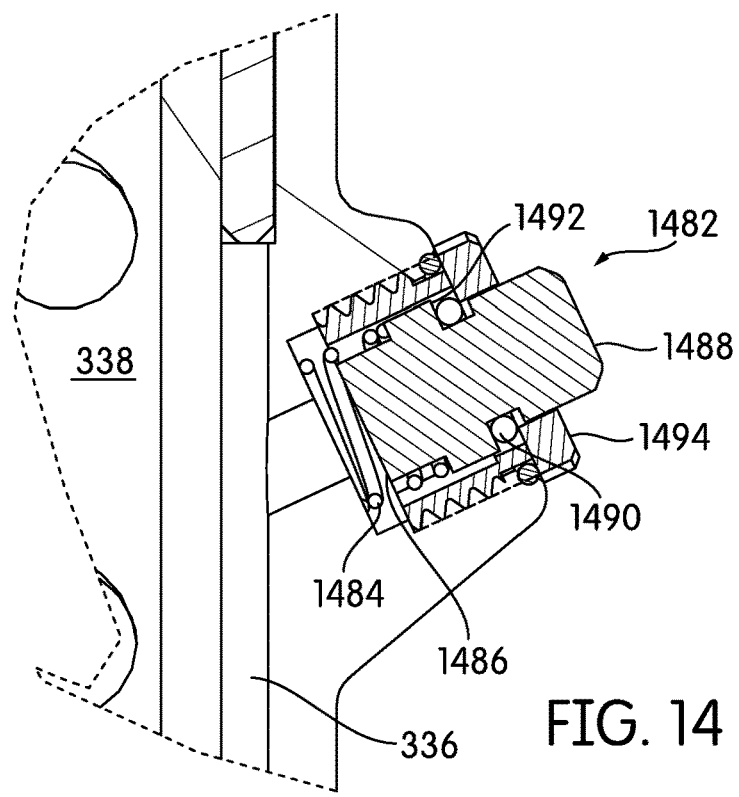
FIG. 14 is an enlarged view of the circled portion of the embodiment shown in FIG. 3 and numbered as 14.
Figure 15:
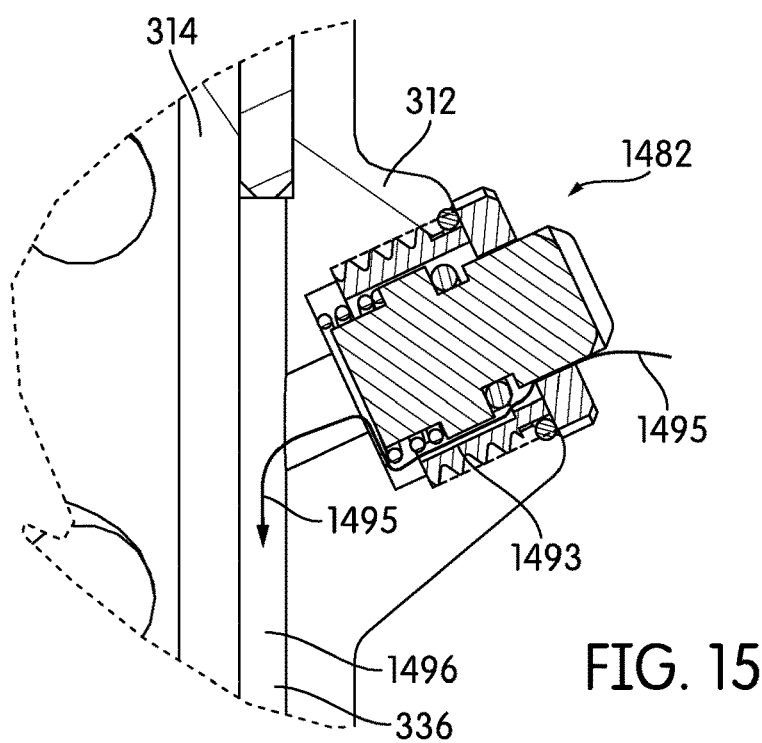
FIG. 15 is a view of the structure of FIG. 14 with the spring in a compressed position.

As noted above, the pressure or force of the gas within the suspension system may be at or around ambient air pressure, and a second substantially one-way valve may be included to allow ambient air to enter the suspension system. Cross sections of the second substantially one-way valve 1482, which may permit air to enter directly into the first chamber 336 may be seen in FIGS. 14 and 15 FIG. 14 illustrates the substantially one-way valve 1482 in a closed position, and FIG. 15 illustrates the substantially one-way valve 1482 in an open position. In the embodiment shown in FIGS. 14 and 15, the substantially one-way valve 1482 is shown as a poppet, but other, similar configurations could be used instead. In the illustrated embodiment, force from a spring 1484 and air pressure from the first chamber 336 may press against a first side 1486 of the blocker 1488. This pressure or force may tend to force the blocker 1488 away from the first chamber 336, thereby pressing a seal 1490, such as the o-ring illustrated, between a shoulder 1492 on the blocker 1488 and a support 1494. This placement of the seal 1490 between the shoulder 1492 and the support 1494 may tend to block air from flowing past the seal 1490. In many embodiments, the spring force applied by the spring 1484 against the blocker 1488 is slight, so that when the force of the air pressure within the first chamber 336 drops below atmospheric pressure, force from the ambient air (which is generally at or around atmospheric pressure) may tend to overcome the force from the air in the first chamber 336 and the second chamber 338 and the force of the spring 1484, thereby moving the blocker 1488 towards the second chamber 338 and compressing the spring 1484, as is seen in FIG. 15. This movement of the blocker 1488 may tend to allow air to flow through the passageway 1493 along the flow path illustrated using the arrow numbered 1495. The air may tend to enter an annular space 1496 between the first tube 312 and the second tube 314 and enter the first chamber 336. In many embodiments, the ability to introduce additional air quickly, while preventing the venting of air to the atmosphere, may tend to maintain optimum performance of the suspension 100 by minimizing or preventing the creation of a vacuum within the first chamber 336.

The venting of air may be further undesirable, in many bicycle configurations, because vented air may be contaminated with lubricants that are generally present within a suspension. Venting from the suspension may be undesirable because the introduction of a lubricant adjacent such parts as the ride surface of the tire and/or a conventional disc brake, may tend to negatively affect those parts. In addition, the venting of lubricant generally may be unnoticed by a rider. Accordingly, the lubricant may be deposited on a variety of adjacent surfaces, including the tire, wheel, hub, spokes, frame, and even on the rider's clothing, causing these parts to attract and retain dust, dirt, and still other contaminants.

In the disclosed embodiments, blockers, springs, and apertures of various sizes and shapes were illustrated. The precise configurations of these items are shown in an illustrative fashion only. A designer can easily change the shape, size, material, number or other features of these items to achieve a particular flow characteristic that the designer may deem particularly desirable or helpful. These modifications are well within the knowledge of a designer having ordinary skill in the art.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:

1. A suspension system, comprising:
    a first tube having a closed end and at least partially defining a first chamber substantially filled with a gas;
    a second tube having a free end interfitted with the first tube and at least partially defining a second chamber substantially filled with the gas;
    a barrier adjacent the free end of the second tube, the barrier including a first substantially one-way valve allowing the gas to flow from the second chamber to the first chamber;
    a hollow rod attached to the first tube and extending through the barrier and into the second tube, the hollow rod having an interior cavity and an open end and defining at least one orifice allowing the gas to flow between the first chamber and the interior cavity;
    an adjustable blocker capable of controlling the rate at which the gas flows through the at least one orifice during movement of the barrier towards the closed end of the first tube; and
    a second substantially one-way valve permitting the introduction of additional gas from outside the first and second tubes into one of the first and second chambers while substantially preventing the venting of gas from the first and second chambers to outside the first and second tubes;
    wherein, upon a compression stroke, movement of the barrier within the first tube moves at least some of the gas from the first chamber through the orifice at a rate depending on the position of the adjustable blocker, into the interior cavity, and into the second chamber;
    wherein, upon an expansion stroke, at least some of the gas flows through the first substantially one-way valve; and
    wherein the gas is substantially retained within the first and second tubes during the compression and expansion strokes.

2. The suspension system according to claim 1, further comprising a resilient member attached to the adjustable blocker.

3. The suspension system according to claim 1, further comprising a resilient member adjacent the adjustable blocker.

4. The suspension system according to claim 1, wherein the second substantially one-way valve comprises a spring and a blocker.

5. The suspension system according to claim 1, further comprising an adjuster attached to the adjustable blocker.

6. The suspension system according to claim 5, wherein a free end of the adjuster extends from the first tube, and wherein rotation of at least one portion of the adjuster causes axial movement of the adjustable blocker.

7. The suspension system according to claim 6, wherein the free end of the adjuster maintains a single axial position, regardless of its rotational position.

8. The suspension system according to claim 1, wherein the first substantially one-way valve comprises a seal that is gas permeable in a first direction from the second chamber to the first chamber and prevents gas flow in a second, opposite direction.

9. The suspension system according to claim 1, further comprising a mechanical spring in the second tube.

10. The suspension system according to claim 9, wherein the introduction of additional gas from outside the first and second tubes is made directly into the first chamber.

* * * * *